April 29, 1930.  H. C. MERRILL  1,756,654
CASTING MACHINE
Filed April 8, 1927   2 Sheets-Sheet 1
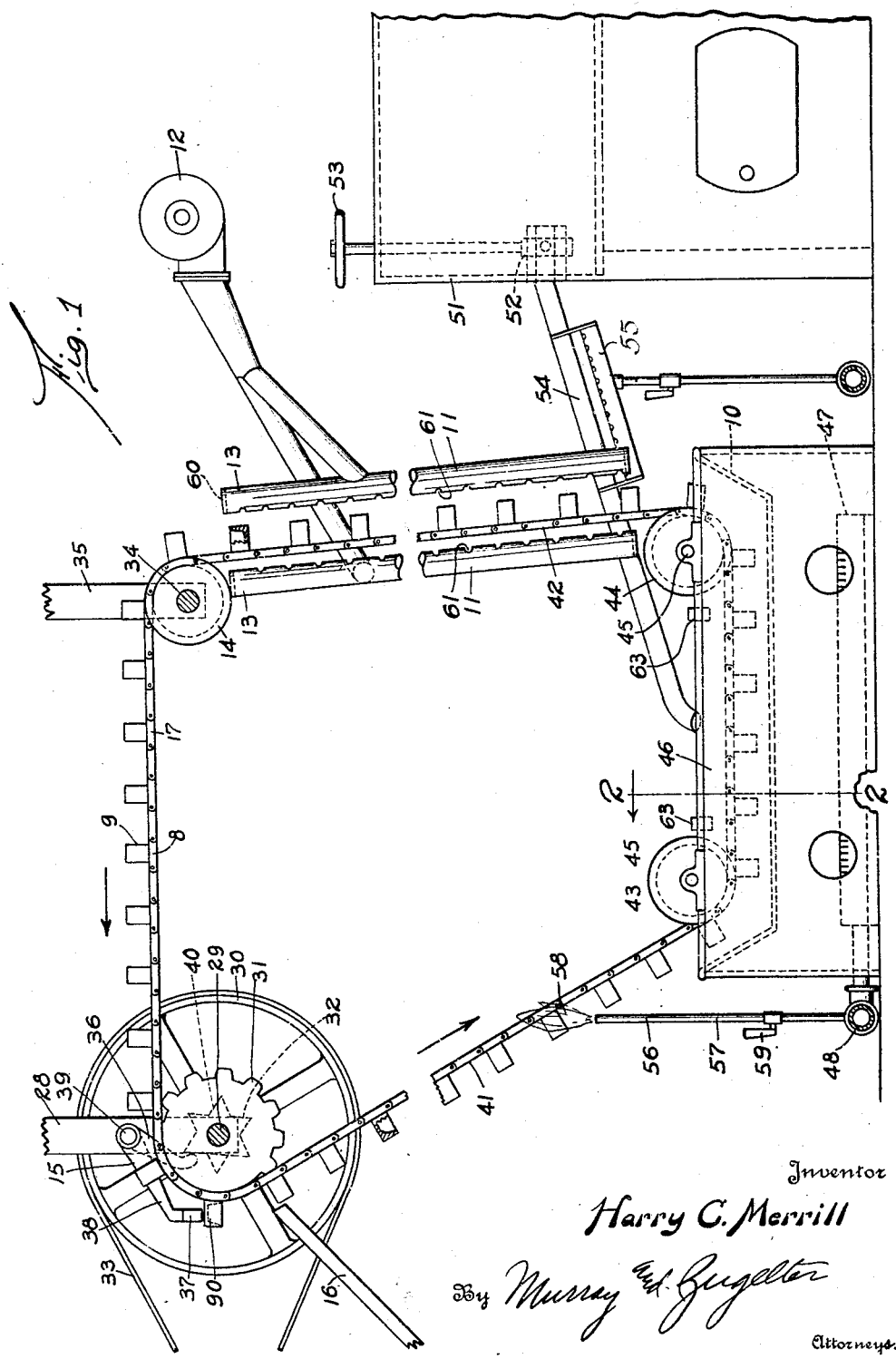
Inventor
Harry C. Merrill
By Murray & Gugelter
Attorneys.

April 29, 1930.                H. C. MERRILL                 1,756,654
                              CASTING MACHINE
                            Filed April 8, 1927         2 Sheets-Sheet 2
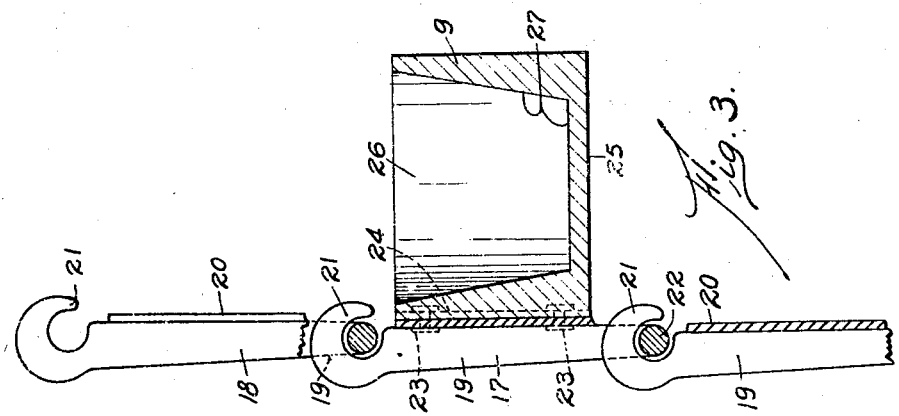
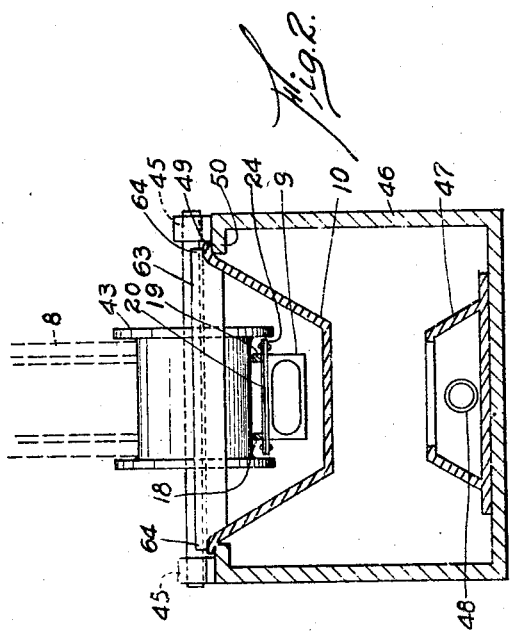
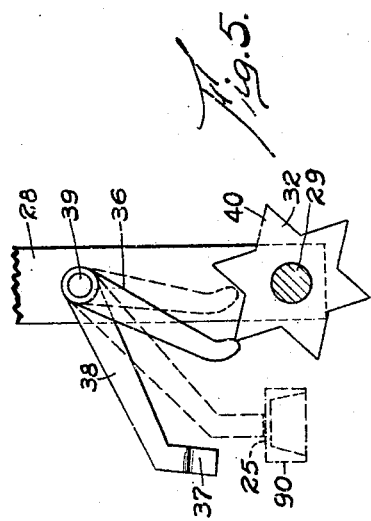
Inventor
Harry C. Merrill
By Murray and Zugelter
            Attorneys Patented Apr. 29, 1930

1,756,654

UNITED STATES PATENT OFFICE

HARRY C. MERRILL, OF CINCINNATI, OHIO, ASSIGNOR TO THE EAGLE-PICHER LEAD COMPANY, OF CINCINNATI, OHIO, A CORPORATION OF OHIO

CASTING MACHINE

Application filed April 3, 1927. Serial No. 182,160.

This invention relates to a device for expeditiously forming solid objects from a molten or fluid mass of material such as molten lead or solder and the like.

An object of the invention is to provide a device that will form bar solder or lead objects with a minimum of waste material.

Another object is to mold metallic objects which will have a smoother finish than it has heretofore been possible to acquire.

Another object is to expedite the operation of forming such objects and to diminish the amount of manual labor heretofore necessary in the manufacture thereof.

Another object is to provide a device for the purposes stated which requires little attention and is inexpensive to operate.

These and other objects are attained by the means described herein and disclosed in the accompanying drawings, in which:

Fig. 1 is a side elevational view partly in section showing the device of the invention.

Fig. 2 is a sectional view on line 2—2 of Fig. 1.

Fig. 3 is a detail view partly in section, showing a mold and conveyor means.

Fig. 4 is an elevational view of a bar of solder or lead produced by the device of the invention.

Fig. 5 is a detail view of a discharge mechanism forming part of the invention.

Although the device of the present invention is described herein as applied to metal working or casting, it is obviously adapted for use in the manufacture of other articles made by shaping a molten or fluid mass and subsequently transforming it into a solid body or finished article. For the purpose of explanation, the device is described as used in the manufacture of bar solder or lead bars of convenient size, such as are used in portable melting pots and also for soldering purposes.

The device comprises briefly a conveyor 8 carrying bucket shaped molds 9 which are adapted to be immersed in a container 10 of molten solder or lead and to be withdrawn therefrom in an upright position, filled with the molten metal. The filled molds thereupon travel upwardly between a pair of perforate tubes 11 which direct cooling air from a blower 12 upon the filled molds. As a filled mold approaches the uppermost ends 13 of tubes 11, the fluid metal contained therein becomes solidified, due to the cooling process. The filled mold thereupon passes under a hammer mechanism 15 which strikes the bottom of the mold, thereby dislodging the solid bar from the interior of the mold. The solid bar then falls from the mold and strikes a chute 16 by means of which the bar is conveyed to a keg or other container, not shown, and is ready for shipment. The various mechanisms for accomplishing the above operations will now be described in detail.

The conveyor 8 is preferably of the chain type in which links 17, comprising side plates 18 and 19 joined by a web or plate 20, are coupled together by any suitable means such as that shown in Fig. 3. The means here employed comprises a hook portion 21 on one end of each side plate forming the link, said hooks being adapted for receiving a transverse bar 22 joining the opposite ends of the side plates, thereby coupling the links together for forming a flexible conveyor. Any number of such links may be joined to form an endless conveyor, the length of which determines the capacity and speed of operation of the device.

Buckets or molds 9 of any desired shape are secured to adjacent or alternate links 17 by means of rivets or the like 23 passing through a flange 24 on the mold and the web 20 which connects and spaces the side plates 18 and 19 of the link. As shown in Fig. 3, the mold is provided with a bottom 25, and a mouth 26 for filling and emptying the mold. The inner surfaces 27 are preferably highly finished.

Upon a suitable support member 28, which may be secured to a floor or ceiling, is mounted a freely rotatable shaft 29 having keyed or otherwise secured thereto a pulley wheel 30, sprocket 31 and cam wheel 32. A belt 33 transmits motion of a motor or engine, not shown, to the pulley and shaft for rotating the cam and the sprocket. The conveyor 8 passes over and receives its continuous motion in the direction indicated by the arrows, from sprocket 31. The conveyor is also supported upon a conveyor roller 14 mounted upon a shaft 34 freely rotatable in a second support member 35.

A hammer mechanism 15 comprising a cam arm 36, and a weighted head 37 carried by an arm 38, is pivotally mounted at 39 upon the support member 28, or, if desired it may have a mounting upon shaft 29. Projections 40 on the cam wheel 32 contact the arm 36 of the hammer mechanism which is so timed in relation to the molds that as each mold assumes the inverted position indicated at 90, the head 37 strikes the bottom 25 of the mold and causes the solidified bar of metal formed therein to drop to the chute 16. Fig. 5 clearly shows the hammer mechanism in its operative and inoperative positions relative to mold 90.

Depending portions 41 and 42 of conveyor 8 are guided by rollers 43 and 44 which are partially disposed within the container 10 as shown in Figs. 1 and 2. The rollers are on shafts rotatably mounted in bearings 45 secured to a heater casing 46 inside of which is disposed a suitable burner 47 fed by a fuel inlet 48. Container 10 has a flange 49 which rests upon a flange 50 of the casing 46.

Although it would be possible to feed lump lead to container 10 as the molten material is removed by the molds, it is found that to feed molten lead from a furnace 51 is desirable. Lead is allowed to flow from the furnace through a valve 52 having control means 53. A length of tubing 54, preferably heated by a burner 55, conveys the fluid lead to the heated container 10. In this manner, the presence of solid lumps of metal in the container 10 is precluded.

A means for precluding sticking of the molten fluid to the conveyor and molds is also provided. The said means comprises a smoker 56 which consists of any fuel burning device emitting a smoke or soot which will form upon the conveyor and molds. As shown in Fig. 1, the smoker comprises a fuel pipe 57 at the free end of which a flame 58 may be directed upon the parts to be smoked. A valve 59 controls the flame. It is obvious that molds of the depending portion 41 are inverted while those on the depending portion 42 are in an upright position and are filled with molten metal. It should be noted that tubes 11 are provided with end caps 60 thus precluding escape of air from the blower 12 through any exit other than perforations 61.

For the purpose of confining the slag or dross which forms on the surface of the molten mass, so that a pure finished product is secured, metal bars 63 are mounted transversely of the container 10 as shown in Fig. 2. The bars are suspended from lugs 64 which rest upon the top of container 10, whereby the bars extend partly above and partly below the surface of the molten metal in the container. It is obvious that any slag that might enter the container 10 by way of conduit 54 will be confined to the surface between the bars 63, thus precluding its entry into the molds or buckets 9. The surface of the molten metal is periodically skimmed of slag. The result of this arrangement is the production of a bar of greater purity.

It has been found that the device here described not only expedites the operation of casting lead bars, but also delivers a finished product having a smoother and more attractive surface than lead bars manufactured by the method heretofore in use. Furthermore, in the old method, there was considerable metal spilled and wasted due to careless handling by workmen. This device eliminates all wastage and effects a great increase in production.

What is claimed is—

1. In a device for casting metallic bars, the combination of a container for holding a quantity of molten metal, a support means disposed above the container, a drive member and a conveyor roller carried by the support means, a second conveyor roller adapted to extend into the container of molten metal, an endless conveyor comprising a plurality of hollow molds and disposed about the drive member and the conveyor rollers, the drive member imparting continuous motion to the conveyor, and the second roller serving to immerse each mold in the container of molten metal for filling the mold with the molten metal, means for subsequently directing a cooling medium upon the filled molds whereby to solidify the metal contained therein, and means comprising a hammer member mounted adjacent the drive member, for striking each mold as it approaches the hammer thereby loosening the metallic bar from the interior of the mold and assuring its discharge therefrom.

2. In a device for casting metallic bars, the combination of a container for holding a quantity of molten metal, means for feeding molten metal to the container, a heater associated with the container for heating the container and retaining the moten metal in a fluid state, an endless conveyor comprising a plurality of spaced molds adapted to be successively moved into the container of molten metal and withdrawn therefrom filled with the molten metal, means for directing a cooling medium upon the filled molds during their movement from the container for solidifying the molten metal in the molds, means for inverting the molds during their continued movement, and means for dislodging the solidifying metal bar from the interior of the inverted mold, whereby to discharge the bar.

3. In a device for casting metallic bars, the combination of a container for holding a quantity of molten metal, means for feeding molten metal to the container, a heater associated with the container for heating the container and retaining the molten metal in a fluid state, an endless conveyor comprising a plurality of spaced molds adapted to be successively moved into the container of molten metal and withdrawn therefrom filled with the molten metal, means for precluding adhesion of the molten metal to the mold interior, means for directing a cooling medium upon the filled molds during their movement from the container for solidifying the molten metal in the molds, means for inverting the molds during their continued movement, and means for dislodging the solidified metal bar from the interior of the inverted mold, whereby to discharge the bar.

4. In a device for casting bars, the combination of a heater, a container associated with the heater and adapted for containing molten material, a conveyor comprising bucket shaped molds adapted to extend into the container of molten material for filling the molds with molten material and for withdrawing the filled molds from the container in an upright position, means for solidifying the molten material within the molds and comprising a perforate tube and a blower connected therewith, the perforations of the tube being so disposed as to direct air under pressure upon the molds, and a hammer for striking the molds for discharging therefrom the solidified material.

5. A metal bar casting device comprising an endless mold conveyor moving in a vertical plane for alternate inversion and righting of the molds, a molten metal supply disposed below the conveyor and into which the molds are projected for filling the molds with molten metal, and means for receiving the contents of the molds when inverted above the metal supply.

6. A metal bar casting device comprising an endless bucket conveyor moving in a vertical plane for alternate inversion and righting of the buckets, a molten metal supply disposed below the conveyor and into which the buckets are projected for filling the buckets with molten metal, means for receiving the contents of the buckets when inverted above the metal supply, and means between the receiving means and metal supply for treating the buckets and conveyor for precluding adhesion of molten metal thereto.

7. A metal bar casting device comprising an endless bucket conveyor moving in a vertical plane for alternate inversion and righting of the buckets, a molten metal supply disposed below the conveyor and into which the buckets are projected for filling the buckets with molten metal, means for directing a cooling medium upon the filled buckets for solidifying the molten metal contained therein and means for receiving the contents of the buckets when inverted above the molten metal supply.

8. A casting device comprising an endless bucket conveyor moving in a vertical plane for alternate inversion and righting of the the buckets, a tank disposed below the conveyor and into which the buckets are projected for filling the buckets with a molten material which solidifies upon cooling, and means for striking each bucket while in inverted position for dislodging the contents of the bucket after solidification of the molten material in the bucket.

9. A metal bar casting device comprising an endless conveyor provided with buckets and movable in a vertical plane for alternate inversion and righting of the buckets, a molten metal container below the conveyor into which the buckets are projected for filling the buckets with molten metal which solidifies upon cooling, heating means associated with the container for maintaining the metal in a fluid state, a furnace and heated conduit associated with the container for replacing molten metal removed by the buckets, means for treating the conveyor and buckets for precluding adhesion of the metal thereto, means for cooling the filled buckets for solidifying the metal contained therein and means for discharging the resultant solidified metal from the buckets.

10. The combination of a container for molten metal, a heating means associated with the container for maintaining the metal in a fluid state, means for confining floating dross on the surface of the molten metal said means comprising a partition bar adapted to extend into the container, said bar being disposed above and below and spaced from the container thereby providing a dross compartment and a clean metal compartment communicating therewith underneath the partition bar whereby both compartments maintain the same level of fluid metal, means moving through the container for removing molten metal from the clean metal compartment, and means for feeding molten metal to the dross compartment.

11. A metal bar casting device comprising an endless conveyor provided with buckets and movable in a vertical plane for alternate inversion and righting of the buckets, a container below the conveyor and into which the buckets are projected for filling the buckets with a molten metal which solidifies upon cooling, means for confining the dross of the molten metal to preclude entry of said dross into the buckets, and means for discharging the solidified contents of the buckets while in inverted position.

12. A metal bar casting device comprising an endless conveyor provided with buckets and movable in a vertical plane for alternate inversion and righting of the buckets, a container below the conveyor and into which the buckets are successively projected, for filling the buckets with molten metal which solidifies upon cooling, means for confining dross upon the surface of the metal said means comprising spaced depending partition bars disposed within the container transversely thereof, means for feeding to the container the molten metal for the buckets, at a point intermediate the spaced bars, and means for discharging the contents of the buckets after cooling and solidification of said contents 13. A metal bar casting device comprising an endless bucket conveyor moving in a vertical plane for alternate inversion and righting of the buckets, means for treating the conveyor and buckets for precluding adhesion of molten metal thereto, a container disposed below the conveyor and into which the buckets are projected for filling the buckets with molten metal, means for directing a cooling medium upon the filled buckets whereby to cool and solidify the molten metal contained therein and means for receiving the resultant solidified metal bars as the buckets assume the inverted position for discharge of the bars therefrom.

14. The combination with a container for molten metal of means for confining dross floating on the surface of the molten metal said means comprising a partition adapted to extend for a distance into the container above and below the normal height of molten metal, thereby dividing the container into a dross compartment and a clean metal compartment communicating therewith and means moving through the container for removing molten metal from the clean metal compartment.

In testimony whereof, I have hereunto subscribed my name this 7th day of April, 1927.

HARRY C. MERRILL.